April 28, 1953     E. O. GROSKOPF     2,636,543
SOUND DEADENING SHEET MATERIAL AND METHOD OF MANUFACTURE
Filed Jan. 7, 1950
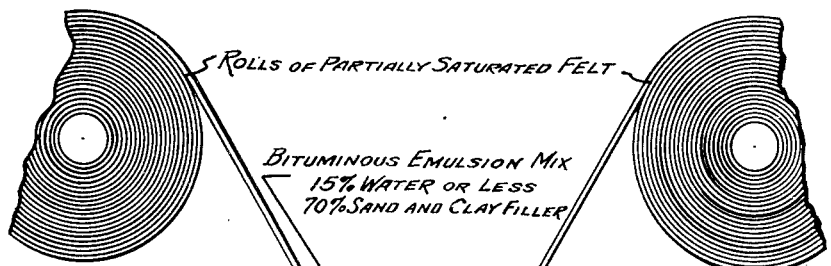
FIG. 1.
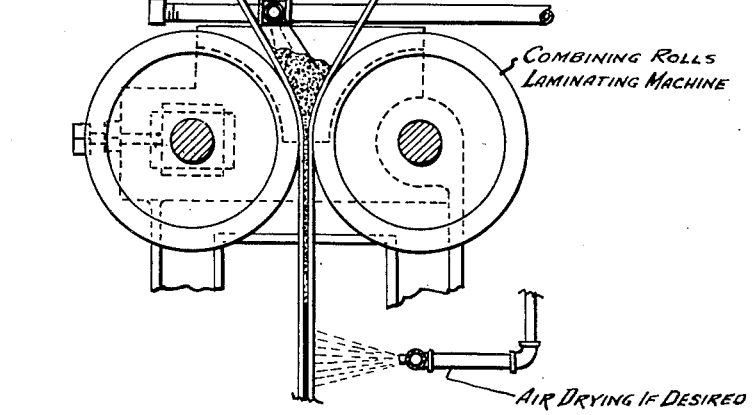
FIG. 2.
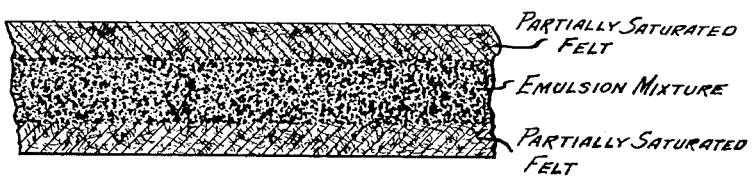
FIG. 3.
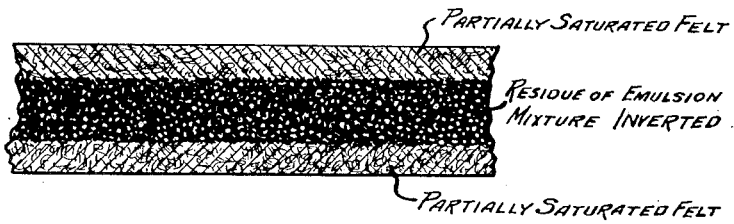
INVENTOR.
EDWIN OTTO GROSKOPF,
BY
ATTORNEYS Patented Apr. 28, 1953

2,636,543

UNITED STATES PATENT OFFICE 2,636,543

SOUND DEADENING SHEET MATERIAL AND METHOD OF MANUFACTURE

Edwin Otto Groskopf, Cincinnati, Ohio, assignor to The Philip Carey Manufacturing Company, Cincinnati, Ohio, a corporation of Ohio Application January 7, 1950, Serial No. 137,477

11 Claims. (Cl. 154—28)

My invention relates to pliable sound deadening sheet material for damping the sound produced by vibratile sheet metal and is particularly suitable for application to sheet metal structures such as are employed in the fabrication of metal bodies for automobile vehicles, and to a method by which such material may be made.

At present the automobile industry deadens the vibratory sound or "drumming" of sheet metal bodies by one of two general methods. The first method is by the spray application of a thick coating of either an emulsion or a solvent preparation of a bituminous composition containing as a filler sand or silex (silica flour) and sometimes containing also a limited amount of other mineral fillers and of a reinforcing fiber such as asbestos. These compositions are commonly referred to as spray-on deadeners. Several large automobile manufacturers now use very large amounts of such types of spray-on deadeners for application to the inside of the floor and side wall panels of the automobile body.

The second method, which also is in extensive use by several large automobile manufacturers, employs fibrous sheet material which is cemented or otherwise attached to the sheet metal structure which is to be sound deadened. The fibrous sheet materials used include fabrics, felts or pads of various thicknesses, as single sheets or combinations of two or more layers, made from organic fibers such as cotton, wool or jute, or from glass fibers. The most extensively used material is an asphalt impregnated organic fiber felt which is generally similar in character to the asphalt saturated felt used as a base for the manufacture of asphalt shingles and roll roofings. Both methods of sound deadening, the spray-on composition and the cemented fibrous sheet, quite often are employed for different areas of the metal body of the same automobile, due to differences in the amount of sound damping required and in ease of application of the two types of material.

It has been found that some parts of the automobile body require greater deadening than others. In the case where spray-on deadener is used greater efficiency may be provided by applying a thicker layer or using a heavier composition. Where cemented fibrous sheets are employed the desired degree of deadening can be obtained by installing multiple layers of the material. It is known also that the degree of sound damping obtained with either method is largely dependent upon the mass effect of the deadening material and to a lesser extent upon absorption by the material of the sound that is generated by the vibration of the metal sheet.

A particularly difficult problem is the sound deadening of the dash panel which separates the engine compartment from the body of the car. It is essential to reduce the transmission of engine noise into the space occupied by the passengers and also to prevent excessive transfer of heat through the dash, particularly in hot weather. The deadening material used therefore should also be an effective thermal insulation. Multiple layers of asphalt-impregnated felt have quite generally been used for deadening the dash panel, sometimes in combination with a pad or batt of glass fibers of about ⅜ inch. The area of the dash panel requiring deadening is commonly about 9 to 10 square feet per car. The degree of sound damping obtained by the use of even as many as four layers of asphalt-impregnated felt combined into a board having a thickness of 0.300 inch has been found inadequate and tests have been made with as many as eight plies of such felt attempting to solve this problem. Increasing the number of plies improves the sound deadening efficiency of the structure by increasing its mass or weight, but also increases the cost proportionately.

It has been determined that sheet lead is a very efficient sound deadener for the dash panel because its high density enables it to exert a very great mass effect. However, sheet lead does not have suitable physical properties to enable it to be punched and fastened to the panel. Because it is a metal its thermal insulating properties are very poor. Furthermore, lead is not available commercially in the quantities that would be required and its cost is too high to be economic for this use. My invention is directed to solving this problem by combining in a single product the essential characteristics of a sheet material that has greatly improved sound deadening efficiency by reason of its great mass effect, can be readily fabricated from available raw materials, has pliability and plasticity to such a degree that it is easy to handle and install in the car, has substantial thermal insulation value, and can be produced at a low cost.

Attempts to obtain the required mass effect by thicker applications of spray-on deadeners have not proved practical because the nature of these coatings involves serious problems of application, drying, cracking of the dried coating, shrinkage, loss of adhesion, brittleness at low temperatures and other difficulties. Hot mixed mineral filled asphalt mastics have been produced in thick slab form and experimented with for deadening the dash panel. Such a slab has greater density than the asphalt-impregnated felt structures and gives a desirable mass effect, but is not practical for use because it cannot easily be punched or fabricated, it tends to soften and flow from the heat of the engine, it is difficult to fit and attach securely to the dash panel, and it becomes very brittle and fractures easily in cold weather.

My invention embodies in a fabricated sheet product the desirable characteristics of an asphalt emulsion-type spray-on sound deadener (these qualities including mass effect, stability against flow under heat, freedom from brittleness at low temperatures, and low cost) combined with the desirable characteristics of bitumen-impregnated felt structures (including ease of cutting and punching, pliability, plasticity that enables the panel to conform to the metal, toughness, and thermal insulation value).

An asphalt emulsion-type spray-on deadener has been developed and is extensively used for spraying on the inside of the floor, trunk compartment, and rear quarter panels of the car body. This emulsion imparts a permanent stable structure to the coalesced dried asphalt film after the water has been removed. Fine sand is generally used as the mineral filler for the spray-on deadener and this is held in suspension and stabilized by the asphalt emulsion until the material is applied to the metal by spraying. The application is mechanically difficult and involves high labor cost. This type of deadener gives effective sound damping, but adequate time and suitable ovens to evaporate the water in the spray-on deadener coating must be provided.

It is one of the objects of my invention to make a mineral-filled emulsion deadener composition that contains a substantially increased proportion of solids and a correspondingly reduced proportion of water, while still maintaining the composition of fluid consistency such that it may be pumped, sprayed, or spread into a uniform layer by rolls or doctor blades. The minimum solids content of the composition should be 85 per cent by weight and preferably is 90 per cent or more by weight. In the preferred composition the total water content of the composition does not exceed 10 per cent. By so increasing the solids content and reducing the water content I am enabled to achieve the further object of my invention which is to combine the emulsion-deadener composition with a fibrous sheet carrier, thereby producing a unitary sound deadener sheet material that has the advantages above set forth.

In carrying out my invention the emulsion-deadener composition is combined with one or more layers of fibrous sheet material. For example, a sheet of suitable bitumen-impregnated felt may have a layer of the emulsion-deadener composition applied and adhered to one side or to both sides of the felt. In the preferred form of my invention the construction is that of a "sandwich" in which a layer of the emulsion-deadener composition is incorporated between two layers of the felt, forming a sandwich-type panel or board. Likewise, I may construct a "double-decker" sandwich by employing three layers of the felt in combination with two layers of the emulsion-deadener composition. The sandwich-type board has the great advantage that it can be handled and applied in the same manner as for multi-ply felt sound deadener boards, but its overall properties in respect to weight and sound deadening effectiveness are largely determined by the thickness and composition of the emulsion-deadener filling layer or layers.

It is a further object of my invention to so combine the ingredients in the emulsion deadener composition that this layer itself will have sufficient moisture permeability as to gradually permit the evaporation of its moisture content through the more pervious surfacing sheet. In describing this quality I use the terms "permeable" and "permeability." This quality of permeability permits evaporation not only of moisture but also of volatile solvents with which it may be brought into contact.

The fibrous sheet carrier which I employ for combining with the emulsion-deadener must be of a special character. It must be capable of being brought into contact with a water-emulsion without loss of sheet integrity or excessive loss of strength. It also must be permeable to moisture both in the form of liquid water and of water vapor. An asphalt-impregnated felt containing between about 35 per cent and 95 per cent by weight (based on the unsaturated felt weight) of saturant is suitable although a narrower range of about 45 per cent to about 75 per cent by weight is preferable. An asphalt-impregnated felt containing saturant in the range above specified is not completely saturated and does not have all its interior void spaces filled with asphalt; it therefore remains permeable to water vapor and to liquid water to some extent, but does not disintegrate or exhibit excessive loss of strength when brought into contact with the emulsion-deadener. A fully saturated asphalt felt on the other hand, normally contains from 120 per cent to 200 per cent by weight of asphalt; it therefore is substantially impermeable both to liquid water and to water vapor and will not serve the purpose of my invention. I may, however, use in place of asphalt-impregnated felt other permeable fibrous sheets, including woven fabrics, porous papers, non-woven cemented fibrous webs, or perforated sheets, provided they are either inherently resistant to disintegration by the action of moisture or have been so treated with a suitable water-resistant binder or water-repellent material that they do not lose integrity of sheet structure when combined with the emulsion-deadener composition. The fibrous sheet may be smooth or it may be indented or embossed to increase its thickness and enhance its sound deadening effectiveness.

In making the emulsion-deadener composition for use in fabricating the new product of my invention, I have found it very advantageous to use a soft, flexible, low softening point asphalt as this ensures that the composite panel board will be pliable and non-friable at low temperatures. Such an asphalt is particularly suitable for use in an emulsion-deadener, but cannot be used for the same purpose if made as a hot mastic or as a solvent cut-back composition. The latter two types of compositions are inherently more impermeable than bituminous emulsions and they also flow into the pores of the fibrous felt to a greater extent and render it more impermeable so that it is unsuitable for cementing to metal with the special adhesives commonly used in the automobile industry for this purpose. These adhesives employ a volatile solvent and when in contact with an impermeable felt or an impervious inner layer such as hot asphalt mastic or a solvent cut-back mastic, the solvent does not diffuse and evaporate rapidly enough to develop the required adhesion strength between the metal and the sound deadener sheet, particularly when the sheet has been applied only a short time before passage through high temperature ovens.

In making the emulsion-deadener composition for use in my new product, my invention contemplates by the use of a suitable percentage of a bituminous emulsion and the selection of the proper screen size gradation of a heavy mineral filler such as fine sand, the production of a composition containing as high as 90 per cent by weight of solids while still maintaining the composition of a fluid consistency that is workable or pourable. By selection of a mineral filler of greater density than sand, such as iron oxide (powdered magnetite) or barium sulfate (powdered barytes), or by using a powdered metal such as iron filings, I have found that the solids content of the emulsion-deadener composition can be further increased, even considerably beyond 90 per cent by weight.

As a specific example of an emulsion-deadener composition that gives satisfactory results in the production of my new sandwich-type sound deadener board, the following materials are thoroughly mixed in a suitable mixer:

| | Pounds |
|---|---|
| Static asphalt emulsion (containing approx. 50% water, 3½% of bentonite and 46½% of bitumen) | 266 |
| Kaolin clay | 94 |
| Fine graded sand | 650 |
| | 1010 |

The static asphalt emulsion in the above formula is prepared from a suitable soft asphalt (softening point in the range 75° to 130° F.), emulsified with a mineral colloid, such as bentonite, as the stabilizer for the dispersion of the asphalt particles in water. The emulsion-deadener composition as prepared for use contains about 87 per cent solids by weight, in the above example. It is of suitable consistency to be flowed on a coating or combining machine in a continuous uniform layer, between two sheets of moisture-permeable felt.

The manufacture of my new sound deadener panel may readily be carried out on any suitably equipped laminating or combining machine which has reels for supplying two or more sheets of fibrous felt continuously to a combining conveyor. Thus the sandwich-type board may be made by continuously supplying two sheets of permeable asphalt-impregnated felt, preferably indented or "waffled," to the combining rolls and feeding therebetween a layer of the emulsion-deadener of regulated thickness to produce the finished board of desired caliper. When the emulsion-deadener is brought into contact with the permeable felt some of the water content of the emulsion-deadener is absorbed by the felt and this causes the asphalt particles to coalesce. As the water is withdrawn from the emulsion the asphalt particles act to cement the sand and clay into a solid mass and to adhere this hardened mass to the asphalt-impregnated felt. Since the water content of the emulsion-deadener is small, not exceeding 15 per cent by weight of the material as applied on the machine, there is absorption only a small amount of absorption and evaporation from the combined board to reduce the moisture content of the product to that which is normally present in equilibrium with atmospheric moisture. The redistribution of the moisture content within the product and normal evaporation to the air may be sufficient, but for additional drying I have found it entirely practical to direct currents of forced air against the surfaces of the board on the laminating machine. The entire composite sheet being permeable to moisture, as set forth hereinabove, is preferably dried to a moisture content of five per cent or less.

Thus I have shown diagrammatically in Figure 1, a suitable laminating or combining machine, the drawing showing a machine like that shown in Figure 1 of the Smith Patent No. 1,195,408 of August 22, 1916, and the webs of absorbent moisture-permeable, partly saturated felt being fed together with a supply therebetween of bituminous emulsion of low water content heavily loaded with finely divided mineral matter which bonds to the felts forming, after moisture from the emulsion has been absorbed by the felts, the residue layer in which the bituminous particles have coalesced as a result of the inversion of the emulsion, forming the sound deadening sheet material.

Figure 2 shows diagrammatically an enlarged typical cross section of the sound deadening material at the time of bonding.

Figure 3 shows diagrammatically an enlarged typical cross section of the sound deadening material after the bituminous bonding layer has coalesced and the absorption of moisture from the emulsion by the felts has caused the emulsion to invert.

As a specific example, by combining one layer of smooth asphalt-impregnated felt of about 0.065 inch thickness with a layer of indented (waffled) asphalt-impregnated felt of about 0.095 inch thickness, using as the filling layer in the sandwich the above described emulsion-deadener composition applied to a thickness of about 0.140 to 0.150 inch, I have produced a combined board with a thickness of about 0.300 to 0.310 inch and which weighs about 1000 grams per square foot. For comparison, a conventional sound deadener board made by combining four layers of asphalt-impregnated felt each of about 0.067 inch thickness with three layers of hot asphalt each of about 0.010 inch thickness had a caliper of about 0.300 to 0.310 inch and weighed about 500 grams per square foot. Thus, it is evident that for the same thickness my new product weighs about twice as much per square foot as the present commercial sound deadener board and has a correspondingly greater mass effect in damping vibratory sound.

Because sand, clay and asphalt are much lower in cost than felt, my product, having superior sound deadening effectiveness, can be produced more cheaply than present commercial felt-asphalt sound deadener boards. My invention eliminates from the conventional construction two layers of expensive felt, replaced by a layer of emulsion-deadener which contains (in the dried film) about 85 per cent by weight of sand and clay and about 15 per cent by weight of asphalt.

As a further example of the advantages of my invention, I have found that I can make an emulsion-deadener sandwich board of the same weight per square foot as the conventional four-ply felt and asphalt board by employing two layers of asphalt-impregnated felt each of about 0.067 inch thickness combined with a layer of emulsion-deadener of about 0.066 inch thickness. The thickness of the resulting sandwich-type board is about 0.200 inch as compared with about 0.300 inch for the four-ply felt and asphalt board, and they are of equivalent sound deadening effectiveness. My new sandwich-type deadener will accomplish the same degree of sound deadening at a much lower cost.

My invention is not limited to the particular proportions of materials set forth above, but may be varied within fairly wide limits to produce an improved sound deadening panel. The determinants of the variations depend upon retention of the properties of high weight per unit area; freedom from any tendency for the filling layer to soften or extrude from between the cover sheets under normal conditions of heat of the parts of the automobile on which the sound deadener has been applied, or during the period while the automobile body is subjected to oven temperatures as high as 450° F. on the production assembly line; freedom from brittleness at low temperatures; freedom from cracking, splitting or delaminating; and maintenance of pliability, plasticity and toughness such that with changes of temperature the sheet does not tend to warp or separate from the metal panel against which it has been secured.

While the best results will be obtained by producing the sound-deadener sheet of my invention in accordance with the variations in compositions and proportions as set forth, some of the advantages of my invention may still be obtained within somewhat wider limits, particularly as to the composition of the emulsion-deadener used for the intermediate layer of the sandwich. I have found that the emulsion-deadener should contain not less than 70 per cent by weight of finely divided mineral matter (including sand, clay and other mineral fillers), not less than 10 per cent by weight of asphalt, tar or other bitumen having a low softening point (in the range from 75° to 170° F.), a stabilizer for the asphalt emulsion to prevent flow of the dried film under heat such for example, as about 450° F., and not more than 15 per cent by weight of water.

As to the permeable fibrous sheets used in producing the sandwich-type deadener, these can vary in thickness. Organic fiber felt is produced commercially in the range from about 0.020 to 0.100 inch thickness. In making my new product I may use a fibrous sheet as thin as 0.010 inch provided the sheet is adequately strong for conveying the fabricated board over the combining machine and for handling and application of the finished sound deadener board. Normally, I employ felt sheets in the range of thickness from 0.030 to 0.070 inch in the manufacture of this product. The thickness of the emulsion-deadener filling layer may range between about .030 and 0.500 inch, but usually will be employed in the range between 0.060 and 0.300 inch to afford the optimum combination of properties of the product.

While broadly my invention comprises a sandwich felt structure having a pliable plastic filler layer composed of emulsified bituminous material binding a high proportion of finely divided mineral matter, it is preferable that for maximum effectiveness as a sound deadener and for minimum cost the filler layer should be of greater thickness than the layers of fibrous sheet material between which the filler material is disposed. Thus, the full advantages of my invention will not be realized unless the filler layer is of sufficient thickness to be functionally effective by reason of its mass effect. I have found that for effective sound damping the finished sheet should be not less than .060 inch in thickness.

Having thus described by invention, what I claim as new and desire to secure by Letters Patent is:

1. Sound deadening sheet material having the following desirable characteristics: ease of cutting and punching, pliability and plasticity which enables the material to be shaped to conform to the shape of metal parts, toughness, thermal insulation value, mass effect, stability against flow under heat and freedom from brittleness at low temperatures; and consisting of a sandwich having surface plies of an absorbent moisture-permeable, partly saturated felt containing from 45 to 75% of bituminous saturant based on the weight of the dry felt, and an intermediate bonding layer adhering to the adjacent surfaces of said plies of felt, said bonding layer being the residue of a bituminous emulsion comprising, by weight, not less than 70% finely divided mineral matter, not less than 10% bituminous material, and not more than 15% of water.

2. Sound deadening sheet material as set forth in claim 1 wherein the finely divided mineral matter comprises as its essential major component, finely graded sand.

3. Sound deadening sheet material as set forth in claim 1 wherein the finely divided mineral matter consists in about 13 per cent kaolin clay and 87 per cent finely graded sand.

4. Sound deadening sheet material as set forth in claim 1 wherein the thickness of the combined board is from about 0.300 to 0.310 inch and which weighs about 1000 gms. per square foot.

5. Sound deadening sheet material as set forth in claim 1 wherein the bituminous saturant for the partial saturation of the felt has a melting point of from 75° to 130° F.

6. A method of producing a composite sound deadening sheet material consisting of conveying between spaced rollers two sheets of absorbent, moisture-permeable felted fabric containing from 45 to 75% by weight of bituminous saturant, supplying between said spaced sheets a layer of a fluid emulsion-deadener composition comprising at least 70 per cent by weight of finely divided mineral matter, and not less than about 10 per cent of bitumen and not more than about 15 per cent of water, maintaining said sheets and said emulsion-deadener composition in contact whereby a part of the water of the emulsion is absorbed by said absorbent, moisture-permeable felted sheets and said withdrawal of water causes coalescence of the asphalt particles of said asphalt emulsion, said coalesced asphalt particles binding said finely divided mineral matter into a solid mass and adhering said mass securely to said absorbent, moisture-permeable sheets, and air drying said composite sheet material to reduce its moisture content to about 5 per cent or less by weight.

7. A method as set forth in claim 6 wherein the bituminous saturant has a melting point of from 70° to 130° F.

8. A method as set forth in claim 6 wherein the finely divided mineral matter comprises as its essential major component finely graded sand.

9. A method as set forth in claim 6 wherein the finely divided mineral matter is about 13 per cent kaolin clay and 87 per cent finely graded sand.

10. A method as set forth in claim 6 wherein the thickness of the felt is about .067 inch in thickness and the thickness of the bonding layer is about .066 inch in thickness, making a combined thickness of about .200 inch.

11. A method of producing a composite sound deadening sheet material consisting of conveying between spaced rollers two sheets of felted fabric partially saturated with bitumen only to the point where said fabric remains moisture-permeable, supplying between said spaced sheets a layer of a fluid emulsion deadening composition comprising at least about 70 per cent by weight of finely divided mineral matter, about 10 per cent of bitumen and about 15 per cent of water, maintaining said sheets and said emulsion deadener composition in contact whereby sufficient water from the emulsion is absorbed by said felted sheets and said withdrawal of water causes coalescence of the asphalt particles of said asphalt emulsion, said coalesced asphalt particles binding said finely divided mineral matter into a solid mass and adhering said mass securely to said absorbent, moisture-permeable sheets, and air drying said composite sheet material to reduce its moisture content.

EDWIN OTTO GROSKOPF.

References Cited in the file of this patent

UNITED STATES PATENTS

| Number | Name | Date |
|---|---|---|
| 1,195,408 | Smith | Aug. 22, 1916 |
| 2,008,654 | Clarvoe | July 16, 1935 |
| 2,057,251 | Seigle | Oct. 13, 1936 |
| 2,180,305 | Groskopf | Nov. 14, 1939 |

FOREIGN PATENTS

| Number | Country | Date |
|---|---|---|
| 513,255 | Great Britain | Oct. 9, 1939 |